United States Patent
Poo et al.

(10) Patent No.: US 8,171,309 B1
(45) Date of Patent: May 1, 2012

(54) SECURE MEMORY CONTROLLED ACCESS

(75) Inventors: Tze Lei Poo, Sunnyvale, CA (US); Gregory Burd, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 782 days.

(21) Appl. No.: 12/271,761

(22) Filed: Nov. 14, 2008

Related U.S. Application Data

(60) Provisional application No. 60/988,591, filed on Nov. 16, 2007.

(51) Int. Cl.
*G06F 11/30* (2006.01)

(52) U.S. Cl. ........ 713/189; 713/182; 713/190; 713/191; 713/192; 713/193

(58) Field of Classification Search .................. 713/182, 713/189–193
See application file for complete search history.

(56) References Cited

U.S. PATENT DOCUMENTS

| | | | |
|---|---|---|---|
| 5,617,118 A | 4/1997 | Thompson | |
| 5,673,416 A | 9/1997 | Chee et al. | |
| 5,771,356 A | 6/1998 | Leger et al. | |
| 5,828,835 A | 10/1998 | Isfeld et al. | |
| 5,884,099 A | 3/1999 | Klingelhofer | |
| 6,014,722 A | 1/2000 | Rudin et al. | |
| 6,092,108 A | 7/2000 | DiPlacido et al. | |
| 6,230,277 B1 | 5/2001 | Nakaoka et al. | |
| 6,330,626 B1 | 12/2001 | Dennin et al. | |
| 6,564,318 B1 | 5/2003 | Gharda et al. | |
| 6,711,447 B1 | 3/2004 | Saeed | |
| 6,756,988 B1 | 6/2004 | Wang et al. | |
| 6,823,472 B1 | 11/2004 | DeKoning et al. | |
| 6,832,280 B2 | 12/2004 | Malik et al. | |
| 7,089,419 B2 * | 8/2006 | Foster et al. | 713/166 |
| 7,103,788 B1 | 9/2006 | Souza et al. | |
| 7,194,638 B1 | 3/2007 | Larky | |
| 7,266,842 B2 * | 9/2007 | Foster et al. | 726/17 |
| 7,299,365 B2 * | 11/2007 | Evans | 713/189 |
| 7,308,591 B2 | 12/2007 | Dubinsky | |
| 7,356,707 B2 * | 4/2008 | Foster et al. | 713/189 |
| 7,496,952 B2 | 2/2009 | Edwards et al. | |
| 7,596,614 B2 | 9/2009 | Saunderson et al. | |

(Continued)

FOREIGN PATENT DOCUMENTS

EP   1847911   10/2007

OTHER PUBLICATIONS

"PCT Partial Search Report", Application Serial No. PCT/US2008/078343, Partial International Search,(Mar. 5, 2009), 2 pages.

(Continued)

*Primary Examiner* — Krisna Lim

(57) ABSTRACT

Secure memory controlled access is described. In embodiment(s), memory stores encrypted data and the memory includes a secure memory partition to store cryptographically sensitive data utilized to control access to the encrypted data stored on the memory. Controller firmware can access the encrypted data stored on the memory, but is precluded from access to the secure memory partition and the cryptographically sensitive data. Secure firmware can access the cryptographically sensitive data stored on the secure memory partition to control access by the controller firmware to the encrypted data stored on the memory.

34 Claims, 6 Drawing Sheets

U.S. PATENT DOCUMENTS

| | | | |
|---|---|---|---|
| 7,774,635 | B2 | 8/2010 | Shiota |
| 7,788,670 | B2 | 8/2010 | Bodas et al. |
| 7,873,841 | B2 | 1/2011 | Mullis, II et al. |
| 8,001,592 | B2 * | 8/2011 | Hatakeyama ............... 726/17 |
| 8,095,816 | B1 | 1/2012 | Chan |
| 2002/0069354 | A1 | 6/2002 | Fallon et al. |
| 2002/0087816 | A1 | 7/2002 | Atkinson et al. |
| 2003/0200453 | A1 * | 10/2003 | Foster et al. ............... 713/200 |
| 2003/0200454 | A1 * | 10/2003 | Foster et al. ............... 713/200 |
| 2003/0208675 | A1 | 11/2003 | Burokas et al. |
| 2004/0266386 | A1 | 12/2004 | Kuo |
| 2005/0033869 | A1 | 2/2005 | Cline |
| 2005/0055547 | A1 | 3/2005 | Kawamura |
| 2005/0086551 | A1 | 4/2005 | Wirasinghe et al. |
| 2005/0108171 | A1 * | 5/2005 | Bajikar et al. ............... 705/51 |
| 2005/0156925 | A1 | 7/2005 | Fong et al. |
| 2006/0072748 | A1 * | 4/2006 | Buer ............................ 380/44 |
| 2006/0075259 | A1 * | 4/2006 | Bajikar et al. ............... 713/189 |
| 2006/0123248 | A1 * | 6/2006 | Porter et al. ............... 713/193 |
| 2006/0136735 | A1 * | 6/2006 | Plotkin et al. ............... 713/182 |
| 2006/0142906 | A1 | 6/2006 | Brozovich et al. |
| 2007/0005824 | A1 | 1/2007 | Howard |
| 2007/0011445 | A1 | 1/2007 | Waltermann et al. |
| 2007/0234028 | A1 | 10/2007 | Rothman et al. |
| 2007/0260905 | A1 | 11/2007 | Marsden et al. |
| 2007/0277051 | A1 | 11/2007 | Reece et al. |
| 2007/0297606 | A1 * | 12/2007 | Tkacik et al. ............... 380/239 |
| 2008/0016313 | A1 * | 1/2008 | Murotake et al. ............ 711/173 |
| 2008/0034411 | A1 | 2/2008 | Aoyama |
| 2008/0066075 | A1 * | 3/2008 | Nutter et al. ............... 718/107 |
| 2008/0104422 | A1 | 5/2008 | Mullis et al. |
| 2008/0120717 | A1 | 5/2008 | Shakkarwar |
| 2008/0298289 | A1 | 12/2008 | Jeyaseelan |
| 2008/0313462 | A1 | 12/2008 | Zhao et al. |
| 2009/0006658 | A1 | 1/2009 | Gough |
| 2009/0049222 | A1 | 2/2009 | Lee et al. |
| 2009/0199031 | A1 | 8/2009 | Zhang |
| 2010/0023747 | A1 * | 1/2010 | Asnaashari et al. ........ 713/150 |
| 2010/0070751 | A1 | 3/2010 | Chue |
| 2010/0174934 | A1 | 7/2010 | Zhao |

OTHER PUBLICATIONS

"PCT Search Report", Application Serial No. PCT/US2008/078343, (May 18, 2009), 5 pages.

"PCT Search Report", Application No. PCT/US2009/056973, (Nov. 4, 2009),13 pages.

"PCT Search Report and Written Opinion", Application No. PCT/US2009/067767, (Mar. 26, 2010), 12 pages.

"Non-Final Office Action", U.S. Appl. No. 12/178,268, (Dec. 22, 2010), 10 pages.

"Non-Final Office Action", U.S. Appl. No. 12/098,254, (Jan. 14, 2011),8 pages.

"Part 11—Wireless LAN Medium Access Control (MAC) and Physical Layer (PHY) Specifications", *Information Technology—Telecommunications & Information Exchange Between Systems . . . International Standard*, ISO/IEC 8802-11, First Ed., (1999), pp. 1-531.

"Extensions to Direct Link Setup (DLS) Comments", *IEEE*, P802.11z, (Jul. 2009), pp. 1-3.

"Non-Final Office Action", U.S. Appl. No. 12/101,668, (Apr. 5, 2011), 7 pages.

"Final Office Action", U.S. Appl. No. 12/098,254, (May 18, 2011), 11 pages.

"Final Office Action", U.S. Appl. No. 12/178,268, (May 25, 2011), 13 pages.

"Non-Final Office Action", U.S. Appl. No. 12/541,731, (Oct. 21, 2011), 9 pages.

"Non-Final Office Action", U.S. Appl. No. 12/559,987, (Nov. 9, 2011), 10 pages.

"Notice of Allowance", U.S. Appl. No. 12/098,254, (Dec. 14, 2011), 4 pages.

"Notice of Allowance", U.S. Appl. No. 12/098,254, (Sep. 28, 2011), 4 pages.

"Restriction Requirement", U.S. Appl. No. 12/101,668, (Sep. 22, 2011), 6 pages.

"Non-Final Office Action", U.S. Appl. No. 12/178,268, (filed Dec. 21, 2011), 13 pages.

"Non-Final Office Action", U.S. Appl. No. 12/636,558, (filed Jan. 10, 2012), 6 pages.

* cited by examiner

SECURE MEMORY CONTROLLED ACCESS

RELATED APPLICATION

This application claims priority to U.S. Provisional Patent Application Ser. No. 60/988,591 filed Nov. 16, 2007, entitled "Proposed TCG Architecture" to Poo et al., the disclosure of which is incorporated by reference herein in its entirety.

BACKGROUND

The Trusted Computing Group (TCG) is an organization that develops and promotes industry standard security specifications for computers and networks. The security specifications are intended to protect data and other resources from being compromised, such as by malware (malicious software) that may be introduced into a computer or network system.

Hard disk drive controllers are manufactured to include firmware, such as drive firmware and cryptographic firmware, that is implemented to control the various operations and functions of a hard disk drive. A cryptographic module within a hard disk drive controller may include hardware and/or cryptographic (also referred to as secure) firmware to perform key management, authentication protocols, and media encryption operations. The cryptographic firmware is typically a non-modifiable smaller set of code, unlike the drive firmware that is more extensive and subject to frequent updates.

If the drive firmware and cryptographic firmware both run on the same processor, there is no isolation between the two sets of code. This may result in a breach of security if drive firmware is able to access cryptographic data on shared random access memory (RAM) that stores the cryptographically sensitive data, such as encryption keys, locking security partitions, tables of access rights, and the like. Even if the cryptographic firmware does run on a separate processor from the drive firmware, the two sets of code may still not be isolated when there is shared RAM that stores cryptographically sensitive data.

Disk drive manufacturers are exposed to liability for potential security lapses when an employee or other person having access introduces or embeds malware into the drive firmware of a disk drive controller. This type of security compromise during firmware development, implementation, and/or initial distribution is commonly referred to as a warehouse attack.

The malware that is embedded in drive firmware can compromise the security of the encrypted data stored on a disk drive when masquerading as the crypto firmware. In one example, malware can request a key loading operation directly and bypass the authentication scheme needed to access an encrypted data block on a disk drive. The malware can obtain the key encrypting key (KEK) that is the root of trust for the disk drive and return the key value over a host communication path to read the encrypted data and decrypt it elsewhere. In another example, the malware can initiate the output of the cryptographically sensitive data, such as cryptographic keys for encrypting data on the drive media, outside of the cryptographic boundary. When the media encryption keys are recovered, the encrypted data can be read and decoded off-line.

SUMMARY

This summary introduces concepts of secure memory controlled access that are further described below in the Detailed Description. Accordingly, the summary should not be considered to identify essential features nor used to limit the scope of the claimed subject matter.

In embodiment(s) of secure memory controlled access, a memory control system includes memory that stores encrypted data and the memory includes a secure memory partition to store cryptographically sensitive data utilized to control access to the encrypted data stored on the memory. Controller firmware can access the encrypted data stored on the memory, but is precluded from access to the secure memory partition and the cryptographically sensitive data stored on the secure memory partition. Secure firmware can access the cryptographically sensitive data stored on the secure memory partition to control access by the controller firmware to the encrypted data stored on the memory.

In other embodiment(s), a method is implemented to access encrypted data with controller firmware where the encrypted data is stored on memory that includes a secure memory partition, the controller firmware being precluded from accessing the secure memory partition. The method is further implemented to access cryptographically sensitive data with secure firmware where the cryptographically sensitive data is stored on the secure memory partition and utilized to control access to the encrypted data stored on the memory.

In other embodiment(s), a system-on-chip (SoC) includes controller firmware to access encrypted data stored on memory that includes a secure memory partition. The controller firmware is precluded from accessing the secure memory partition of the memory. The SoC also includes secure firmware to access cryptographically sensitive data stored on the secure memory partition where the cryptographically sensitive data can be utilized to control access by the controller firmware to the encrypted data stored on the memory.

BRIEF DESCRIPTION OF THE DRAWINGS

Embodiments of secure memory controlled access are described with reference to the following drawings. The same numbers are used throughout the drawings to reference like features and components.

DETAILED DESCRIPTION

Embodiments of secure memory controlled access provide a memory controller that includes controller firmware which is isolated from secure crypto firmware that manages cryptographically sensitive data and operations for the security of data stored on a memory drive, such as a disk drive or a flash memory drive. A memory, such as random access memory (RAM), includes a secure memory partition to store the cryptographically sensitive data. The controller firmware can access encrypted data that is stored on the memory, but is precluded from access to the secure memory partition and the cryptographically sensitive data, which could be in cleartext. The secure firmware can access the cryptographically sensitive data stored on the secure memory partition to manage the security of the memory drive. In one embodiment, an encrypting memory drive controller can be implemented as part of a Trusted Computing Group (TCG) architecture to isolate the controller firmware from the cryptographically sensitive information that governs access control to the drive data.

While features and concepts of the described systems and methods for secure memory controlled access can be implemented in any number of different environments, systems, networks, and/or various configurations, embodiments of secure memory controlled access are described in the context of the following example networks and environments.

Figure 1:
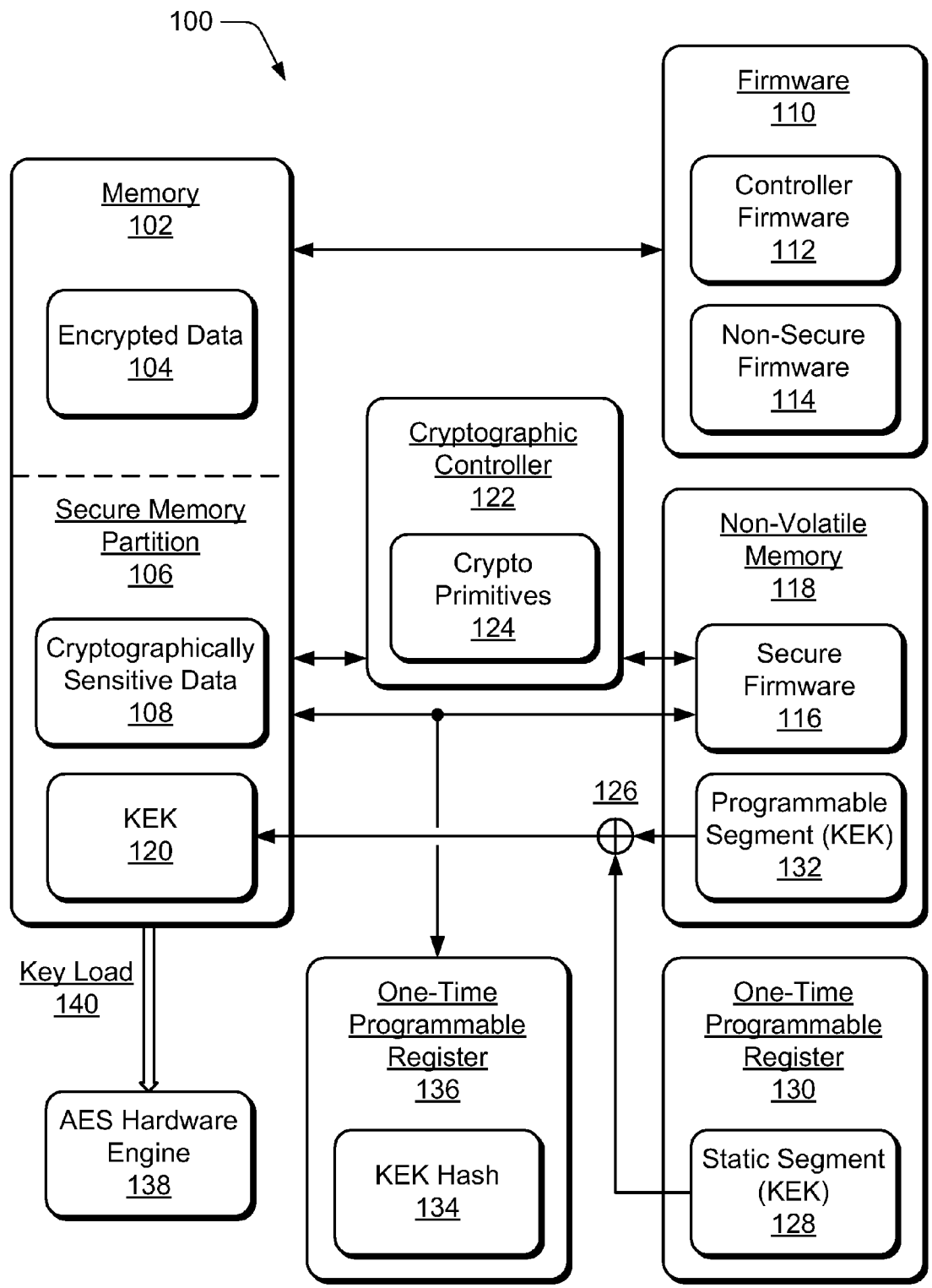
FIG. 1 illustrates an example system in which embodiments of secure memory controlled access can be implemented.

FIG. 1 illustrates an example of a system 100 in which embodiments of secure memory controlled access can be implemented. In an embodiment, system 100 can be implemented as a memory control system, such as a disk drive control system to control a hard disk drive, or a solid state drive control system to control a solid state memory drive in a device, such as in a computer device, media device, video processing and/or rendering device, gaming device, and/or in any other type of device that may include a hard disk drive, a solid state memory drive, or other type of memory drive. System 100 includes a memory 102 to store encrypted data 104, and the memory 102 has a secure memory partition 106 to store cryptographically sensitive data 108. The cryptographically sensitive data 108 can be utilized to control access to the encrypted data 104 that is stored on the memory 102. In various embodiments, the memory 102 can be implemented as any type of random access memory (RAM), such as dynamic random access memory (DRAM), synchronous DRAM (SDRAM), and the like. The secure memory partition 106 of RAM can then be implemented as a secure RAM partition of the memory 102.

System 100 also includes firmware 110, such as controller firmware 112, other non-secure firmware 114, and secure firmware 116 that is maintained in non-volatile memory 118, such as flash memory or read only memory (ROM). The secure firmware 116 can access the cryptographically sensitive data 108 stored on the secure memory partition 106. The secure firmware 116 can also control access to the encrypted data 104 stored on the memory 102. The controller firmware 112 can access the encrypted data stored on the memory 102, but is precluded from access to the secure memory partition 106 and the cryptographically sensitive data 108. In this example system, the controller firmware 112 is isolated, or otherwise separated, from the secure firmware 116 to prevent the controller firmware from being able to access the cryptographically sensitive data 108. The cryptographically sensitive data 108 is not compromised by the controller firmware 112 or any other non-secure firmware 114 even if the controller firmware 112 and the secure firmware 116 are executed on a single processor.

The secure firmware 116 can be implemented to manage session authentication, encryption keys, and cryptographic library function calls for various encryption and authentication algorithms (e.g., RSA, AES, Hash). The secure firmware 116 can be implemented or otherwise manufactured as a non-modifiable component of system 100, and is not updated after being manufactured. Tighter controls can be implemented when secure firmware is manufactured separate from disk drive firmware and/or other types of memory controller firmware to protect the secure firmware from malware that may be introduced into the system via the disk drive or controller firmware. During a boot-up process, the secure firmware 116 is loaded into the secure memory partition 106, and is not accessible by the controller firmware 112 or any other non-secure firmware 114. The controller firmware 112 can be updated without modification to the secure firmware 116 or access to the cryptographically sensitive data 108.

The cryptographically sensitive data 108 can include encryption keys for the encrypted data 104 stored on the memory 102; a key encrypting key (KEK) 120 for a disk drive, solid state drive, or other type of memory drive; access control settings for locking security partitions to access logical block addressing on a disk drive, solid state drive, or other type memory drive; a locking table of the access control settings for the locking security partitions; and any other cryptographically sensitive data that is maintained on the secure memory partition 106. A locking table can be implemented to manage the access control settings for multiple ranges of a disk drive or solid state drive where each range has a unique set of credentials that have the authority to unlock the range for data read/write operations. The data read/write operations can be separately enforced via read-enabled and write-enabled flags.

To unlock a logical block addressing range, a host device that includes the disk drive or solid state drive can issue an unlock method or procedure call for a locking security partition and present a valid set of credentials for the authority to unlock the disk drive or solid state drive. For example, the host device can communicate a password that is be checked against a corresponding credential (such as a password or an encryption key) referenced in the locking security partition records. The locking table, security partitions, encryption keys, and other cryptographically sensitive data 108 can be stored on the secure memory partition 106 or on other non-user addressable media when encrypted.

System 100 also includes a cryptographic controller 122 that can include cryptographic primitives 124 that are accessible by the secure firmware 116, but are not accessible by the controller firmware 112 or other non-secure firmware 114. In an embodiment, the cryptographic primitives 124 can include digital signatures for integrity checking and/or a manufacturer certificate that is utilized as a key signing authority to verify the integrity of secure firmware 116 and/or the controller firmware 112. In an alternate embodiment, the cryptographic primitives 124 can be implemented in hardware as an authority verification function to preclude the controller firmware 112 from masquerading as an authority to bypass authentication when controlled by malware.

In one embodiment, the secure firmware resides in a particular section of the boot-up read only memory (ROM). An address decoder of the secure memory can be implemented to differentiate between a range of instruction addresses coming from the particular section of ROM that correspond to the secure firmware versus instruction addresses coming from a different memory location that correspond to controller firmware. This permits the secure memory to reject access to controller firmware when instruction addresses do not correspond to the particular address range in ROM corresponding to the secure firmware.

The secure firmware 116 can be implemented to initiate generating the key encrypting key (KEK) 120 based on the Advanced Encryption Standard (AES) algorithm. A key derivation function 126 can combine both a static segment 128 of the KEK that is maintained in a one-time programmable register 130, and a programmable segment 132 of the KEK that is maintained in the non-volatile memory 118. The static segment 128 of the KEK can be implemented or otherwise manufactured as non-modifiable and is not updated, reprogrammed, or changed after manufacture. The programmable segment 132 of the KEK can be reprogrammed when the memory drive, such as a disk drive or solid state drive, is repurposed. In an embodiment, the secure firmware 116 can access the static segment 128 of the KEK that is maintained in the one-time programmable register 130. However, the controller firmware 112 is precluded from access to the one-time programmable register 130. In another embodiment, the static segment 128 of the KEK can be locked from access if a debug port is enabled, and the programmable segment 132 of the KEK is erased from the non-volatile memory 118 if the debug port is enabled so that the integrity of the system is not compromised.

The secure firmware 116 can also be implemented to generate a KEK hash 134 from the programmable segment 132 and the static segment 128 of the KEK for integrity checking. The KEK hash 134 can be maintained in an additional one-time programmable register 136 in system 100. When the secure firmware 116 is loaded into secure memory partition 106, the KEK hash 134 can be computed and compared to determine whether the secure firmware 116 has been compromised. A check hash of the KEK 120 can be maintained in an additional one-time programmable register for comparison when a KEK hash is computed. A hash function can reside in the secure firmware 116, non-volatile memory 118, or in hardware.

System 100 also includes an AES hardware engine 138 that can receive the KEK 120 as a key load command 140 from the secure memory partition 106 when initiated by the secure firmware 116. The controller firmware 112 cannot initiate the key load command 140 which provides that authentication is performed at the cryptographic controller 122, and malware cannot control the controller firmware 112 to manipulate the cryptographically sensitive data 108.

An AES component of a host device can communicate with the AES hardware engine 138 of system 100 to establish secure communications with a memory drive, such as a disk drive, solid state drive, or other type of memory drive. Key signing authorities installed during drive manufacturing can be communicated to establish the secure communications, and the host device and the memory drive can exchange encryption keys for data read/write commands. The host device credentials can be received during an authentication process and compared, or otherwise checked against, a corresponding credential stored on the secure memory partition 106.

The arrowed connections shown in the example system 100 (and in each of the FIGS. 1-2 and 5) are merely exemplary to depict the communication links and/or connections between the various components, functions, and/or modules of a device or system. It is contemplated that any one or more of the arrowed communication links facilitate two-way data communication, such as between the secure firmware 116 and the cryptographic controller 122.

Figure 2:
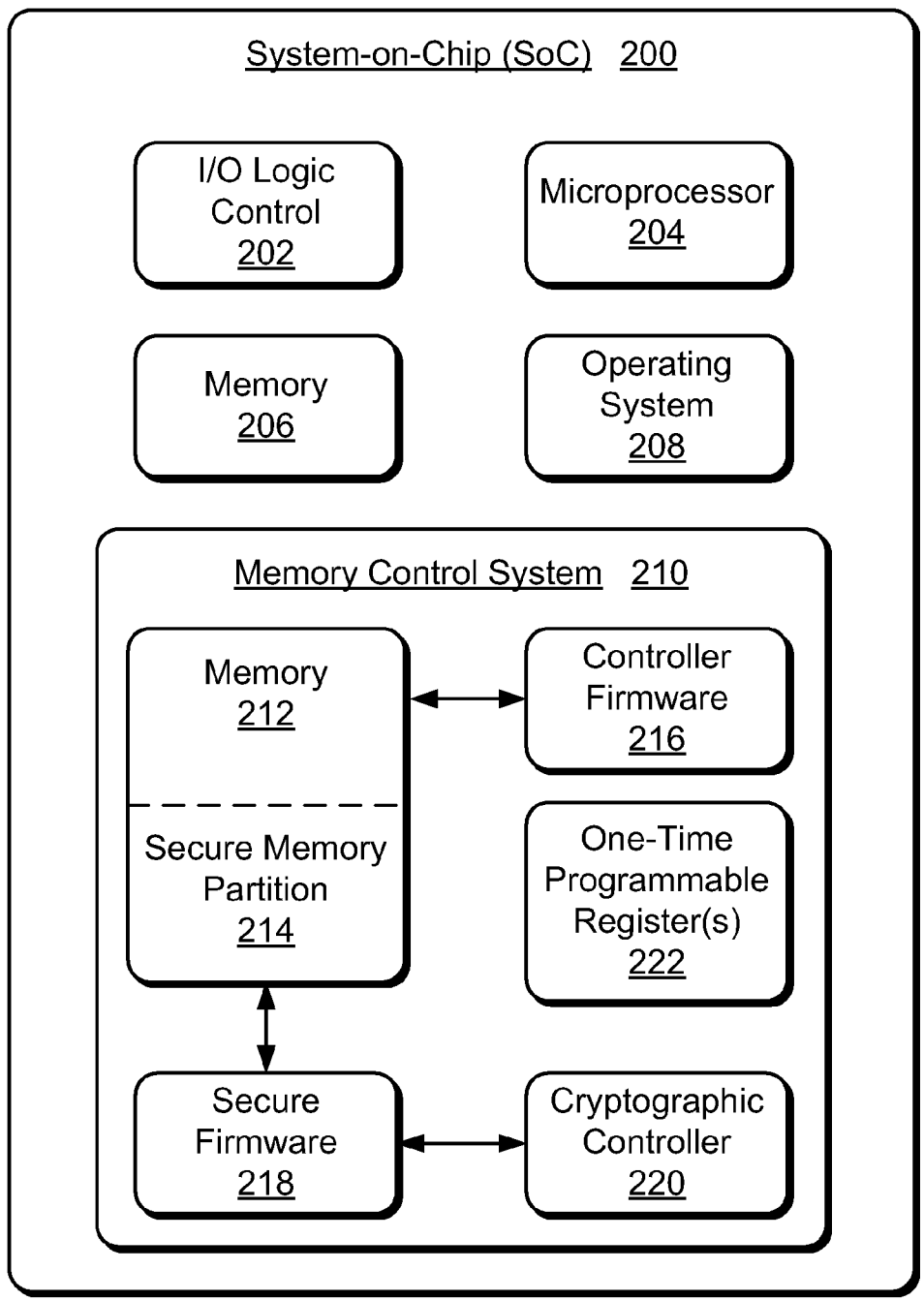
FIG. 2 illustrates an example system-on-chip (SoC) environment in which embodiments of secure memory controlled access can be implemented.

FIG. 2 illustrates an example system-on-chip (SoC) 200 which can implement various embodiments of secure memory controlled access in any type of a consumer electronic device. An SoC can be implemented in a fixed or mobile device, such as any one or combination of a media device, computer device, television set-top box, video processing and/or rendering device, appliance device, gaming device, electronic device, vehicle, workstation, and/or in any other type of device that may include a hard disk drive, solid state drive, or other type of memory drive.

The SoC 200 can be integrated with electronic circuitry, a microprocessor, memory, input-output (I/O) logic control, communication interfaces and components, other hardware, firmware, and/or software needed to run an entire device. The SoC 200 can also include an integrated data bus that couples the various components of the SoC for data communication between the components. A data bus in the SoC can be implemented as any one or a combination of different bus structures, such as a memory bus or memory controller, an advanced system bus, a peripheral bus, a universal serial bus, and/or a processor or local bus that utilizes any of a variety of bus architectures. In addition, a device that includes SoC 200 can also be implemented with any number and combination of differing components as further described with reference to the example device shown in FIG. 6.

In this example, SoC 200 includes various components such as an input-output (I/O) logic control 202 (e.g., to include electronic circuitry, generally) and a microprocessor 204 (e.g., any of a microcontroller, digital signal processor, etc.). The SoC 200 also includes a memory 206 which can be any type of random access memory (RAM), a low-latency nonvolatile memory (e.g., flash memory), read only memory (ROM), and/or other suitable electronic data storage. The SoC 200 can also include various firmware and/or software, such as an operating system 208 which can be computer-executable instructions maintained by memory 206 and executed by microprocessor 204. The SoC 200 can also include other various communication interfaces and components, wireless LAN (WLAN) components, other hardware, firmware, and/or software.

In this example, SoC 200 includes a memory control system 210 which can implement various embodiments of secure memory controlled access. The memory control system 210 includes a memory 212 that has a secure memory partition 214 to store cryptographically sensitive data. The memory control system 210 in SoC 200 also includes controller firmware 216, secure firmware 218, a cryptographic controller 220, and one-time programmable register(s) 222. Examples of these various components, functions, and/or modules, and their corresponding functionality, are described with reference to the respective components of the example system 100 shown in FIG. 1.

The components of the memory control system 210 in SoC 200, either independently or in combination, can be implemented as computer-executable instructions maintained by memory 206 and executed by microprocessor 204 to implement various embodiments and/or features of secure memory controlled access. The memory control system 210, as well as other functionality described to implement embodiments of secure memory controlled access, can also be provided as a service apart from SoC 200. Alternatively and/or in addition, the memory control system 210 can be implemented as hardware, firmware, fixed logic circuitry, or any combination thereof that is implemented in connection with the I/O logic control 202 and/or other signal processing and control circuits of SoC 200.

In an embodiment, the controller firmware 216 and the secure firmware 218 can both be executed by the microprocessor 204. The controller firmware 216 is precluded from accessing the secure memory partition 214 when executed, yet the secure firmware 218 can access the secure memory partition 214 when executed by the microprocessor 204. In an alternate embodiment to isolate the controller firmware 216 from the secure firmware 218, the SoC 200 can include an additional microprocessor that is implemented as a dedicated processor to execute the secure firmware 218 (while the controller firmware 216 is executed by microprocessor 204).

Example methods 300 and 400 are described with reference to respective FIGS. 3 and 4 in accordance with one or more embodiments of secure memory controlled access. Generally, any of the functions, methods, procedures, components, and modules described herein can be implemented using hardware (e.g., fixed logic circuitry), software, firmware, manual processing, or any combination thereof A software implementation of a function, method, procedure, component, or module represents program code that performs specified tasks when executed on a computing-based processor. Example methods 300 and 400 may be described in the general context of computer-executable instructions. Generally, computer-executable instructions can include software, applications, routines, programs, objects, components, data structures, procedures, modules, functions, and the like.

Figure 3:
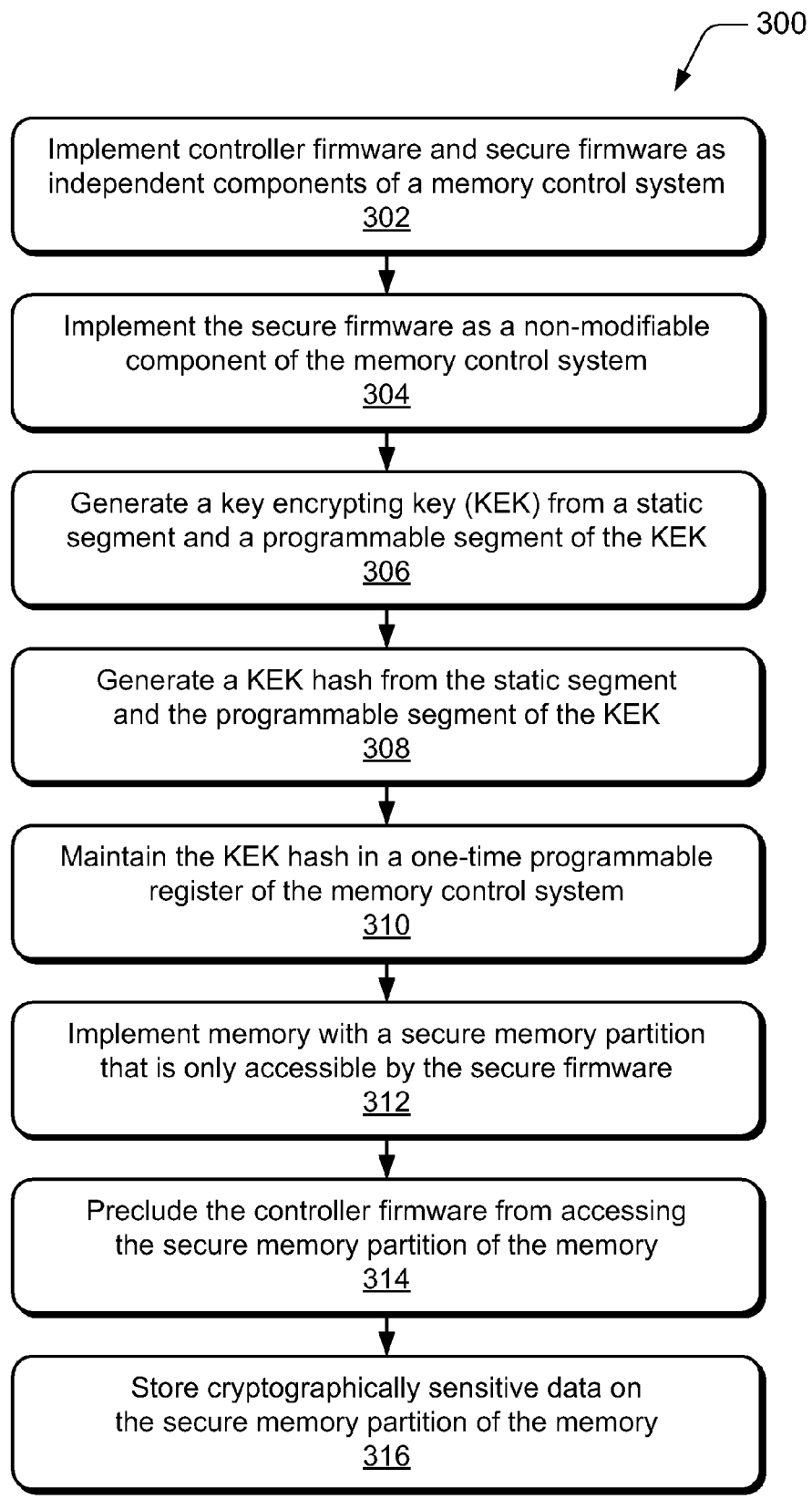
FIG. 3 illustrates an example method of secure memory controlled access in accordance with one or more embodiments.

FIG. 3 illustrates example method(s) 300 of secure memory controlled access and is described with reference to implementing a memory control system. The order in which the method is described is not intended to be construed as a limitation, and any number of the described method blocks can be combined in any order to implement the method, or an alternate method.

At block 302, controller firmware and secure firmware are implemented as independent components of a memory control system. For example, system 100 (FIG. 1) includes controller firmware 112 and secure firmware 116 that are implemented as independent components of the system 100. In an embodiment, system 100 can be implemented as a memory control system, such as a disk drive control system to control a hard disk drive, or a solid state drive control system to control a solid state memory drive in a device, such as in a computer device, media device, video processing and/or rendering device, gaming device, and/or in any other type of device that may include a hard disk drive, a solid state memory drive, or other type of memory drive.

At block 304, the secure firmware is implemented as a non-modifiable component of the memory control system. For example, the secure firmware 116 is implemented in non-volatile memory 118, is a non-modifiable component of system 100, and is not updated after being manufactured. Tighter controls can be implemented when secure firmware is manufactured separate from disk drive firmware and/or other types of memory controller firmware to protect the secure firmware from malware that may be introduced into the system via the memory firmware.

At block 306, a key encrypting key (KEK) is generated from a static segment and a programmable segment of the KEK. For example, the secure firmware 116 can initiate generation of the KEK 120, and the key derivation function 126 can combine both the static segment 128 of the KEK that is maintained in the one-time programmable register 130, and the programmable segment 132 of the KEK that is maintained in the non-volatile memory 118 to generate the KEK 120.

At block 308, a KEK hash is generated from the static segment and the programmable segment of the KEK. For example, the secure firmware 116 can initiate generation of the KEK hash 134 from the static segment 128 and from the programmable segment 132 of the KEK. At block 310, the KEK hash is maintained in a one-time programmable register. For example, the KEK hash 134 is maintained in the one-time programmable register 136 in system 100.

At block 312, a memory is implemented with a secure memory partition that is only accessible by the secure firmware. For example, memory 102 in system 100 has a secure memory partition 106 that is only accessible by the secure firmware 116. At block 314, the controller firmware is precluded from accessing the secure memory partition of the memory. For example, the controller firmware 112 can access encrypted data 104 stored on memory 102, but is precluded from accessing the secure memory partition 106.

At block 316, cryptographically sensitive data is stored on the secure memory partition of the memory. For example, the secure memory partition 106 of memory 102 stores cryptographically sensitive data 108 and KEK 120. The cryptographically sensitive data 108 that is stored can include encryption keys that are utilized to control access to the encrypted data 104 that is stored on the memory 102. The cryptographically sensitive data 108 can also include access control settings for locking security partitions to access logical block addressing on a memory drive, a locking table of the access control settings for the locking security partitions, and any other cryptographically sensitive data that is maintained on the secure memory partition 106.

Figure 4:
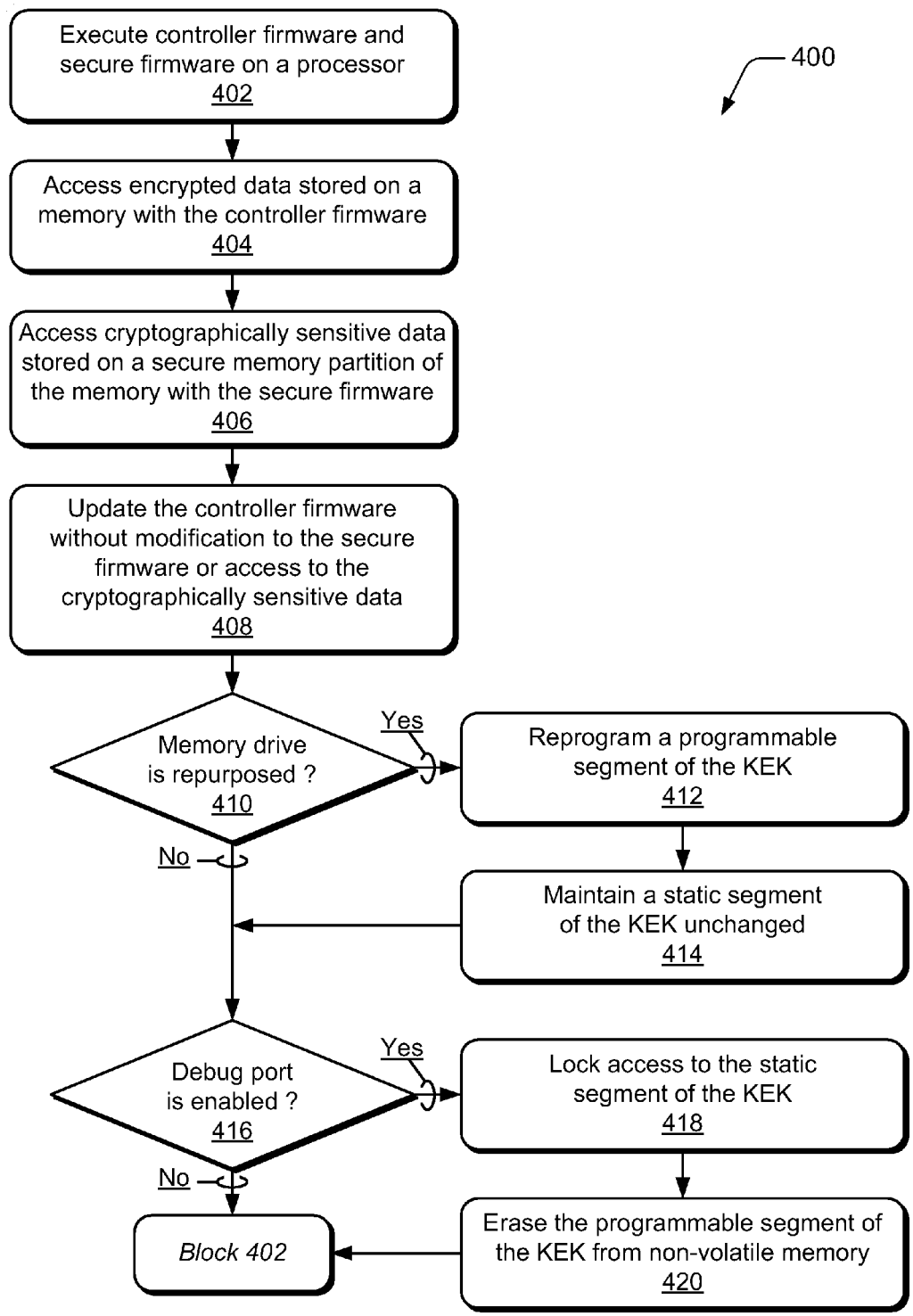
FIG. 4 illustrates an example method of secure memory controlled access in accordance with one or more embodiments.

FIG. 4 illustrates example method(s) 400 of secure memory controlled access. The order in which the method is described is not intended to be construed as a limitation, and any number of the described method blocks can be combined in any order to implement the method, or an alternate method.

At block 402, controller firmware and secure firmware are executed on a processor. For example, on SoC 200 (FIG. 2), the controller firmware 216 and the secure firmware 218 are both executed by the microprocessor 204. The controller firmware 216 is precluded from accessing the secure memory partition 214 when executed, yet the secure firmware 218 accesses the secure memory partition 214 when executed by the microprocessor 204. Cryptographically sensitive data stored on a secure memory partition is not compromised by the controller firmware 216 or any other non-secure firmware even if the controller firmware 216 and the secure firmware 218 are executed on a single processor.

At block 404, encrypted data stored on memory is accessed with the controller firmware. For example, the controller firmware 112 (FIG. 1) accesses the encrypted data 104 stored on memory 102. At block 406, cryptographically sensitive data stored on a secure memory partition of the memory is accessed with the secure firmware. For example, the secure firmware 116 accesses the cryptographically sensitive data 108 stored on the secure memory partition 106. At block 408, the controller firmware is updated without modification to the secure firmware or access to the cryptographically sensitive data. For example, the controller firmware 112 can be updated without modification to the secure firmware 116 or access to the cryptographically sensitive data 108.

At block 410, a determination is made as to whether a memory drive is repurposed. If the memory drive is repurposed (i.e., "yes" from block 410), then at block 412, a programmable segment of the KEK is reprogrammed and, at block 414, a static segment of the KEK is maintained unchanged. For example, the programmable segment 132 of the KEK is reprogrammed when the memory drive is repurposed. However, the static segment 128 of the KEK is non-modifiable and is not updated, reprogrammed, or changed after manufacture.

If the memory drive is not repurposed (i.e., "no" from block 410), or continuing from block 414, a determination is made as to whether a debug port is enabled at block 416. If a debug port is enabled (i.e., "yes" from block 416), then at block 418, access to the static segment of the KEK is locked and, at block 420, the programmable segment of the KEK is erased from non-volatile memory. For example, the static segment 128 of the KEK is locked from access and the programmable segment 132 of the KEK is erased from the non-volatile memory 118 if a debug port is enabled so that the integrity of the system is not compromised. If a debug port is not enabled (i.e., "no" from block 416), or continuing from block 420, the method 400 continues at block 402.

Figure 5:
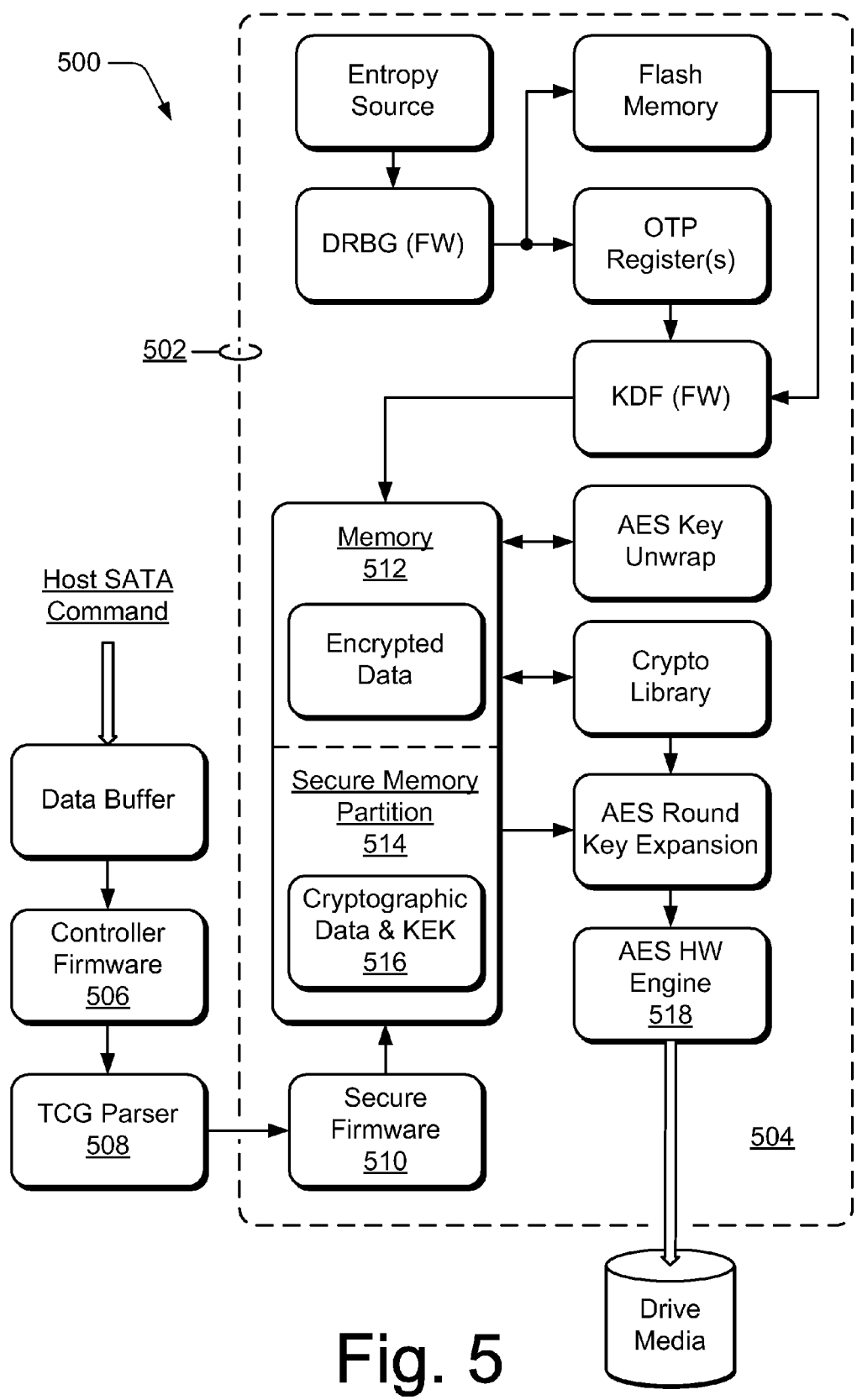
FIG. 5 illustrates an example architecture in which embodiments of secure memory controlled access can be implemented.

FIG. 5 illustrates an example architecture 500 in which embodiments of secure memory controlled access can be implemented. For example, the architecture 500 can be implemented to include a memory control system that is compliant as a Trusted Computing Group (TCG) architecture. In this example, a secure boundary 502 is implemented to isolate various components within a cryptographically secure region 504 of the architecture. Controller firmware 506 and a TCG command parser 508 are implemented outside of the secure boundary 502, and secure firmware 510 is implemented within the secure boundary 502 in the cryptographically secure region 504. In addition, the architecture 500 includes a memory 512 (e.g., RAM) that is implemented within the secure boundary 502 in the cryptographically secure region 504. The memory 512 includes a secure memory partition 514 that stores the cryptographically sensitive data 516. The architecture 500 also includes an AES hardware engine 518 that is implemented within the secure boundary 502 in the cryptographically secure region 504.

Figure 6:
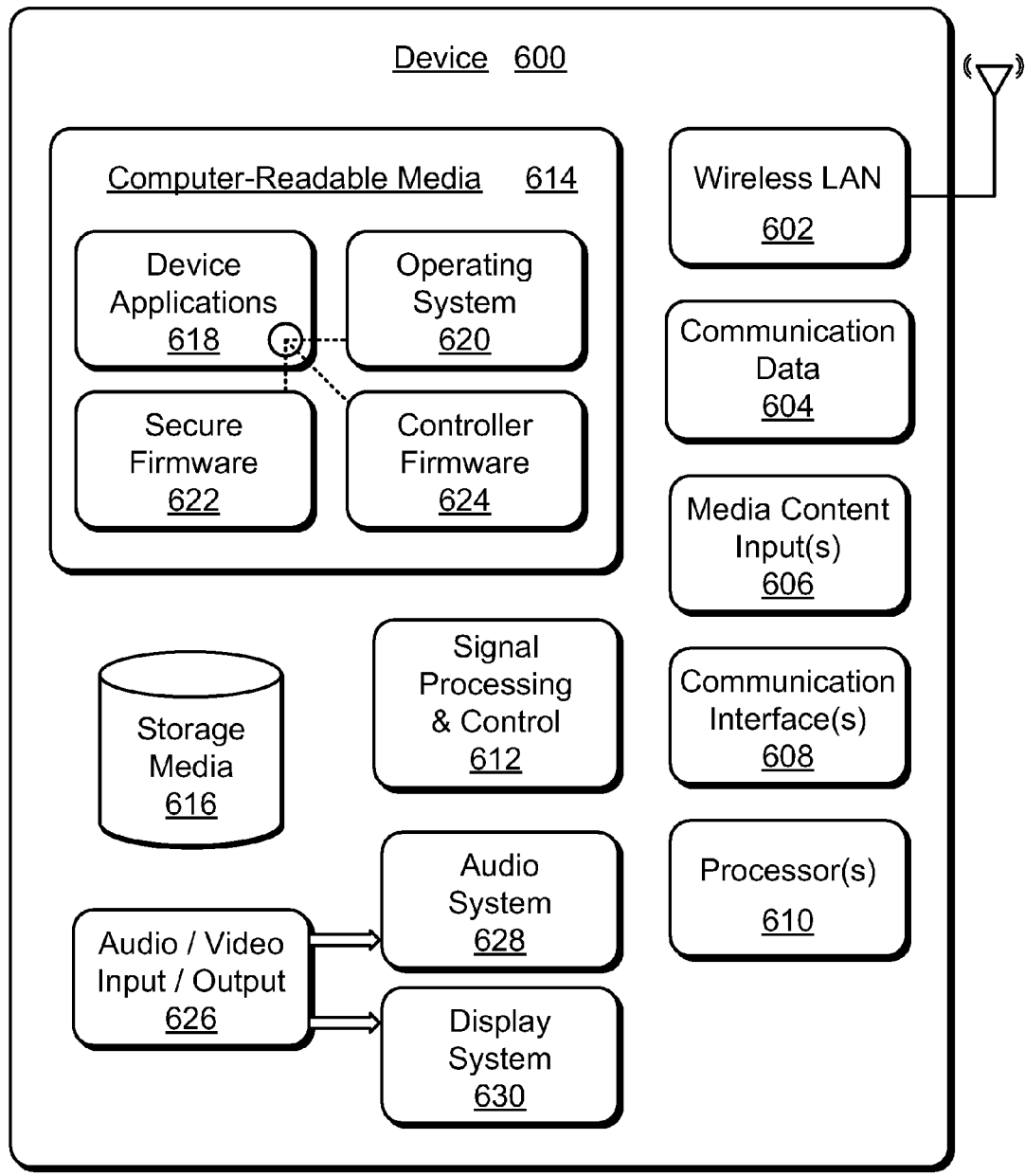
FIG. 6 illustrates various components of an example device that can implement embodiments of secure memory controlled access.

FIG. 6 illustrates various components of an example device 600 that can be implemented as any type of device that includes a memory control system to implement various embodiments of secure memory controlled access. For example, device 600 can be implemented to include example system 100 shown in FIG. 1 and/or can include the system-on-chip (SoC) 200 shown in FIG. 2. In various embodiments, device 600 can be implemented as any one or combination of a media device, computer device, communication device, television set-top box, video processing and/or rendering device, appliance device, gaming device, electronic device, vehicle, workstation, access point, and/or as any other type of device. The device 600 may also be associated with a user (i.e., a person) and/or an entity that operates the device such that a device describes logical devices that include users, software, firmware, and/or a combination of devices.

Device 600 includes wireless LAN (WLAN) components 602, that enable wireless communication of communication data 604 (e.g., received communication data, communication data that is being received, communication data scheduled for broadcast, data packets of the communication data, etc.). Device 600 can also include one or more media content input(s) 606 via which any type of media content can be received, such as music, television media content, video content, and any other type of audio, video, and/or image media content received from a media content source which can be processed, rendered, and/or displayed for viewing.

Device 600 can also include communication interface(s) 608 that can be implemented as any one or more of a serial and/or parallel interface, a wireless interface, any type of network interface, a modem, and as any other type of communication interface. A wireless interface enables device 600 to receive control input commands and other data from an input device, such as from a remote control device, a portable computing-based device (such as a cellular phone), or from another infrared (IR) or similar RF input device.

Device 600 can also include one or more processor(s) 610 (e.g., any of microprocessors, controllers, and the like) which process various computer-executable instructions to control the operation of device 600, to communicate with other electronic and computing devices, and to implement embodiments of secure memory controlled access. Alternatively or in addition, device 600 can be implemented with any one or combination of hardware, firmware, or fixed logic circuitry that is implemented in connection with signal processing and control circuits which are generally identified at 612.

Device 600 can include computer-readable media 614, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like. Device 600 can also include a mass storage media device 616.

Computer-readable media 614 provides data storage mechanisms to store the communication data 604, as well as various device applications 618 and any other types of information and/or data related to operational aspects of device 600. For example, an operating system 620 can be maintained as a computer application with the computer-readable media 614 and executed on processor(s) 610. In one or more embodiments, the device applications 618 can also include a secure firmware 622 and/or controller firmware 624 when device 600 is implemented to include a memory control system and/or secure memory. In this example, the device applications 618 are shown as software modules and/or computer applications that can implement various embodiments of secure memory controlled access.

Device 600 can also include an audio and/or video input/output system 626 that provides audio data to an audio system 628 and/or provides video data to a display system 630. The audio system 628 and/or the display system 630 can include any devices that process, display, and/or otherwise render audio, video, and image data. Video signals and audio signals can be communicated from device 600 to an audio device and/or to a display device via an RF (radio frequency) link, S-video link, composite video link, component video link, DVI (digital video interface), analog audio connection, or other similar communication link. In an embodiment, audio system 628 and/or the display system 630 can be implemented as external components to device 600. Alternatively, the audio system 628 and/or the display system 630 can be implemented as integrated components of the example device 600.

Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Although embodiments of secure memory controlled access have been described in language specific to features and/or methods, it is to be understood that the subject of the appended claims is not necessarily limited to the specific features or methods described. Rather, the specific features and methods are disclosed as example implementations of secure memory controlled access.

The invention claimed is:

1. A memory control system, comprising:
memory configured to store encrypted data, the memory including a secure memory partition configured to store cryptographically sensitive data utilized to control access to the encrypted data stored on the memory, the cryptographically sensitive data including: a key encrypting key (KEK) for a memory drive; and an access control setting for locking security partitions to access logical block addressing on the memory drive;
controller firmware configured to access the encrypted data stored on the memory, the controller firmware being precluded from access to the secure memory partition and the cryptographically sensitive data; and secure firmware configured to access the cryptographically sensitive data stored on the secure memory partition to control access by the controller firmware to the encrypted data stored on the memory.

2. A memory control system as recited in claim 1, wherein the secure firmware is non-modifiable.

3. A memory control system as recited in claim 1, wherein the controller firmware is further configured to be updated without modification to the secure firmware or access to the cryptographically sensitive data.

4. A memory control system as recited in claim 1, wherein the memory is random access memory (RAM) and the secure memory partition is a secure RAM partition that stores the cryptographically sensitive data.

5. A memory control system as recited in claim 1, wherein the cryptographically sensitive data includes multiple encryption keys for the encrypted data stored on the memory.

6. A memory control system as recited in claim 1, wherein the cryptographically sensitive data includes a locking table of the access control settings for locking the security partitions.

7. A memory control system as recited in claim 1, wherein the memory control system is compliant as a Trusted Computing Group (TCG) architecture.

8. A method, comprising:
storing, on a secure memory partition of a memory, a key encrypting key (KEK) for a memory drive as cryptographically sensitive data that includes access control settings for locking security partitions to access logical block addressing on the memory drive;
accessing encrypted data with controller firmware, the encrypted data being stored on the memory that includes the secure memory partition, the controller firmware being precluded from accessing the secure memory partition; and
accessing the cryptographically sensitive data with secure firmware, the cryptographically sensitive data being utilized to control access to the encrypted data stored on the memory.

9. A method as recited in claim 8, further comprising implementing the secure firmware as a non-modifiable component of a memory control system.

10. A method as recited in claim 8, further comprising updating the controller firmware without modification to the secure firmware or access to the cryptographically sensitive data.

11. A method as recited in claim 8, further comprising executing the controller firmware and the secure firmware on one or more processors, the controller firmware being precluded from accessing the secure memory partition when said executing, and the secure firmware accessing the secure memory partition when said executing.

12. A method as recited in claim 8, further comprising storing multiple encryption keys as the cryptographically sensitive data on the secure memory partition, the encryption keys being utilized to control access to the encrypted data stored on the memory.

13. A method as recited in claim 8, wherein the cryptographically sensitive data includes a locking table of the access control settings for locking the security partitions.

14. A system-on-chip (SoC), comprising:
controller firmware configured to access encrypted data stored on memory that includes a secure memory partition, the controller firmware being precluded from access to the secure memory partition; and secure firmware configured to access cryptographically sensitive data stored on the secure memory partition and utilized to control access by the controller firmware to the encrypted data stored on the memory, the cryptographically sensitive data including: a key encrypting key (KEK) for a memory drive; and access control settings for locking security partitions to access logical block addressing on the memory drive.

15. An SoC as recited in claim 14, wherein the cryptographically sensitive data includes a locking table of the access control settings for locking the security partitions.

16. An SoC as recited in claim 14, wherein the KEK is generated from a static segment that is maintained in a one-time programmable register, and from a programmable segment that is maintained in non-volatile memory.

17. A memory control system, comprising:
memory configured to store encrypted data, the memory including a secure memory partition configured to store cryptographically sensitive data utilized to control access to the encrypted data stored on the memory, the cryptographically sensitive data including a key encrypting key (KEK) for a memory drive, the KEK being generated from a static segment that is maintained in a one-time programmable register and from a programmable segment that is maintained in non-volatile memory;
controller firmware configured to access the encrypted data stored on the memory, the controller firmware being precluded from access to the secure memory partition and the cryptographically sensitive data; and
secure firmware configured to access the cryptographically sensitive data stored on the secure memory partition to control access by the controller firmware to the encrypted data stored on the memory.

18. A memory control system as recited in claim 17, wherein the secure firmware is non-modifiable.

19. A memory control system as recited in claim 17, wherein the controller firmware is further configured to be updated without modification to the secure firmware or access to the cryptographically sensitive data.

20. A memory control system as recited in claim 17, wherein the memory is random access memory (RAM) and the secure memory partition is a secure RAM partition that stores the cryptographically sensitive data.

21. A memory control system as recited in claim 17, wherein the cryptographically sensitive data includes multiple encryption keys for the encrypted data stored on the memory.

22. A memory control system as recited in claim 17, wherein the secure firmware is further configured to generate a KEK hash from the programmable segment and the static segment of the KEK, and wherein the KEK hash is maintained in the one-time programmable register.

23. A memory control system as recited in claim 17, wherein the programmable segment of the KEK is configured to reprogram when the memory drive is repurposed, and wherein the static segment of the KEK is not changed when the memory drive is repurposed.

24. A memory control system as recited in claim 17, wherein the secure firmware is further configured to access the static segment of the KEK that is maintained in the one-time programmable register, and wherein the controller firmware is precluded from access to the one-time programmable register.

25. A memory control system as recited in claim 24, wherein the static segment of the KEK is locked from access if a debug port is enabled, and wherein the programmable segment of the KEK is erased from the non-volatile memory if the debug port is enabled.

26. A memory control system as recited in claim 17, wherein the memory control system is compliant as a Trusted Computing Group (TCG) architecture.

27. A method, comprising
storing, on a secure memory partition of a memory, a key encrypting key (KEK) for a memory drive as cryptographically sensitive data, the KEK being generated from a static segment that is maintained in a one-time programmable register and from a programmable segment that is maintained in non-volatile memory;
accessing encrypted data with controller firmware, the encrypted data being stored on the memory that includes the secure memory partition, the controller firmware being precluded from accessing the secure memory partition; and
accessing the cryptographically sensitive data with secure firmware, the cryptographically sensitive data being utilized to control access to the encrypted data stored on the memory.

28. A method as recited in claim 27, further comprising implementing the secure firmware as a non-modifiable component of a memory control system.

29. A method as recited in claim 27, further comprising updating the controller firmware without modification to the secure firmware or access to the cryptographically sensitive data.

30. A method as recited in claim 27, further comprising executing the controller firmware and the secure firmware on one or more processors, the controller firmware being precluded from accessing the secure memory partition when said executing, and the secure firmware accessing the secure memory partition when said executing.

31. A method as recited in claim 27, further comprising storing multiple encryption keys as the cryptographically sensitive data on the secure memory partition, the encryption keys being utilized to control access to the encrypted data stored on the memory.

32. A method as recited in claim 27, further comprising:
generating a KEK hash from the programmable segment and the static segment of the KEK; and
maintaining the KEK hash in an additional one-time programmable register.

33. A method as recited in claim 27, further comprising:
reprogramming the programmable segment of the KEK when the memory drive is repurposed; and
maintaining the static segment of the KEK when the memory drive is repurposed.

34. A method as recited in claim 27, further comprising:
locking access to the static segment of the KEK if a debug port is enabled; and
erasing the programmable segment of the KEK from the non-volatile memory if the debug port is enabled.

* * * * *